US012763707B2

(12) United States Patent
Lin et al.

(10) Patent No.: US 12,763,707 B2
(45) Date of Patent: Oct. 13, 2026

(54) MULTIPHASE MOTOR DRIVING CIRCUIT AND MULTIPHASE MOTOR DRIVING METHOD

(71) Applicant: Richtek Technology Corporation, Zhubei City (TW)

(72) Inventors: I-Chi Lin, New Taipei (TW); Hao-Che Ma, New Taipei (TW); Yuan-Hsun Chang, Taipei (TW); Jong-Ruey Yang, Taipei (TW); Chang-Yi Lin, Hsinchu (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 182 days.

(21) Appl. No.: 18/827,690

(22) Filed: Sep. 7, 2024

(65) Prior Publication Data

US 2025/0096705 A1 Mar. 20, 2025

Related U.S. Application Data

(60) Provisional application No. 63/583,523, filed on Sep. 18, 2023.

(30) Foreign Application Priority Data

Aug. 22, 2024 (TW) ................................ 113131657

(51) Int. Cl.

| | |
|---|---|
| ***H02P 27/06*** | (2006.01) |
| ***H02P 3/02*** | (2006.01) |
| ***H02P 3/10*** | (2006.01) |
| ***H02P 7/291*** | (2016.01) |

(52) U.S. Cl.

CPC .................. *H02P 3/10* (2013.01); *H02P 3/02* (2013.01); *H02P 7/291* (2016.02)

(58) Field of Classification Search

CPC ............... H02P 7/291; H02P 3/02; H02P 3/10

USPC ........................................................ 318/362

See application file for complete search history.

(56) References Cited

U.S. PATENT DOCUMENTS

| | | | | |
|---|---|---|---|---|
| 2012/0013278 | A1* | 1/2012 | Hanlon | H02P 3/18 318/379 |
| 2016/0200355 | A1* | 7/2016 | Mori | H02P 21/22 180/446 |
| 2018/0131298 | A1* | 5/2018 | Qian | H02P 27/047 |
| 2018/0331638 | A1* | 11/2018 | Bastholm | H02P 6/00 |

(Continued)

*Primary Examiner* — Gabriel Agared

(74) *Attorney, Agent, or Firm* — WPAT, P.C.; Anthony King

(57) ABSTRACT

A multiphase motor driving circuit includes: a power stage circuit; and a control circuit. In a motor braking mode, when a holding voltage is less than the first voltage threshold, a first sub-mode is entered, in which the control circuit controls at least a portion of switches in the power stage circuit with a pulse width modulation (PWM) signal to switch periodically, thereby converting a back electromotive force (EMF) of a multiphase motor into the holding voltage to supply power to the control circuit. In the motor braking mode, when the holding voltage is greater than the second voltage threshold, a second sub-mode is entered, in which the control circuit controls at least a portion of switches in the power stage circuit with the PWM signal to keep them continuously conductive, thereby consuming the back EMF of the multiphase motor to reduce a speed of the multiphase motor.

13 Claims, 12 Drawing Sheets

(56) References Cited

U.S. PATENT DOCUMENTS

| | | | | |
|---|---|---|---|---|
| 2020/0343840 | A1 * | 10/2020 | Vanko | G01P 3/48 |
| 2024/0022188 | A1 * | 1/2024 | Geike | H02P 27/08 |

* cited by examiner

MULTIPHASE MOTOR DRIVING CIRCUIT AND MULTIPHASE MOTOR DRIVING METHOD

CROSS REFERENCE

The present invention claims priority to the provisional application Ser. No. 63/583,523, filed on Sep. 18, 2023 and claims priority to the TW patent application No. 113131657, filed on Aug. 22, 2024.

BACKGROUND OF THE PRESENT INVENTION

Field of Invention

The present invention relates to a multiphase motor driving circuit and a multiphase motor driving method, and particularly to a multiphase motor driving circuit and method for achieving power-off braking without requiring additional external circuits.

Description of Related Art

FIG. 1A and FIG. 1B show prior art multiphase motor driving circuits. The prior art technology shown in FIG. 1A utilizes additional external circuits 1, 2, and 3 to achieve power-off braking. Each low-side transistor requires an additional external circuit. FIG. 1B shows the aforementioned additional external circuits 1, 2, and 3, each includes three resistors R1, R2, and R3, and a transistor Q1. LO is a gate signal from a control circuit 101. When power is cut off, a supply voltage VCC drops instantaneously, and a holding voltage VCF will be maintained for a short period according to the capacitance of a capacitor Cf. At this time, the transistor Q1 is turned off due to the pull-down by resistor R2, and a voltage Vgs is divided by a voltage divider formed by resistor R3 and resistor Rs, after which the three-phase low-side transistors are turned on. The multiphase motor thus starts effective braking. In this prior art, the larger the capacitor Cf, the longer the holding voltage VCF can be maintained, meaning that the capacitor Cf is crucial in determining the braking time.

However, in the aforementioned prior art technology, the hardware design is relatively complex and requires additional external component costs and space. The braking time is determined by the capacitance of Cf and the timing of the low-side transistor's conduction. The selection of the capacitor Cf, the resistors, and the low-side transistors must be precisely calculated. To ensure a sufficiently long braking time to completely stop the motor, the capacitance of Cf needs to be increased, thereby increasing cost and form factor requirements.

In view of this, the present invention addresses the shortcomings of the prior art by providing a multiphase motor driving circuit and method that does not require the aforementioned additional external circuits.

SUMMARY OF THE PRESENT INVENTION

In one aspect, the present invention provides a multiphase motor driving circuit, including a power stage circuit, coupled between a holding voltage and a multiphase motor, wherein the power stage circuit is configured to operate the multiphase motor according to a pulse width modulation (PWM) signal; and a control circuit, configured to generate the PWM signal based on power supplied by the holding voltage. In a motor braking mode, when the holding voltage is less than a first voltage threshold, a first sub-mode is entered, wherein in the first sub-mode, the control circuit controls at least a portion of plural switches in the power stage circuit to switch periodically utilizing the PWM signal, thereby converting a back electromotive force (EMF) of the multiphase motor into the holding voltage, which is subsequently used to supply power to the control circuit. In the motor braking mode, when the holding voltage is greater than a second voltage threshold, a second sub-mode is entered, wherein in the second sub-mode, the control circuit controls at least a portion of the plural switches in the power stage circuit to remain continuously conductive utilizing the PWM signal, thereby consuming the back EMF of the multiphase motor, so as to reduce a rotation speed of the multiphase motor.

In one preferred embodiment, in the motor braking mode, the first sub-mode is entered when the holding voltage is less than the first voltage threshold and the rotation speed of the multiphase motor is greater than a rotation speed threshold.

In one preferred embodiment, the multiphase motor driving circuit further includes a path switch, coupled between an input voltage and the holding voltage; wherein, in a motor operating mode, the path switch is controlled to be conductive to electrically connect the holding voltage to the input voltage, wherein the control circuit controls a plurality of switches in the power stage circuit to switch utilizing the PWM signal, thereby converting the holding voltage into a driving voltage to drive the multiphase motor to rotate; and wherein, when the path switch is non-conductive and after waiting for a stabilization time, the motor braking mode is entered.

In one preferred embodiment, the multiphase motor driving circuit further includes a holding capacitor, coupled to the holding voltage, wherein in the first sub-mode of the motor braking mode, the back EMF of the multiphase motor is converted into the holding voltage to charge the holding capacitor.

In one preferred embodiment, the power stage circuit includes a multiphase inverter circuit, wherein the multiphase inverter circuit includes plural high-side switches and plural low-side switches, wherein the plural high-side switches are coupled between the holding voltage and corresponding plural switching nodes, and the plural low-side switches are coupled between the corresponding plural switching nodes and a ground level, the multiphase motor being coupled to the plural switching nodes.

In one preferred embodiment, in the second sub-mode of the motor braking mode, the control circuit controls the plural low-side switches in the power stage circuit to remain continuously conductive utilizing the PWM signal, thereby consuming the back EMF of the multiphase motor, so as to reduce the rotation speed of the multiphase motor.

In one preferred embodiment, in the first sub-mode of the motor braking mode, the control circuit controls the plural low-side switches in the power stage circuit to switch periodically utilizing the PWM signal, thereby converting the back EMF of the multiphase motor into the holding voltage through reverse boost conversion, which is subsequently used to supply power to the control circuit.

In one preferred embodiment, in the first sub-mode of the motor braking mode, the control circuit controls the plural high-side switches in the power stage circuit to remain non-conductive utilizing the PWM signal, thereby performing asynchronous reverse boost conversion through body diodes of the plural high-side switches.

In one preferred embodiment, in the first sub-mode of the motor braking mode, the control circuit further controls the plural high-side switches in the power stage circuit to switch periodically utilizing the PWM signal, thereby converting the back EMF of the multiphase motor into the holding voltage through reverse boost conversion, which is subsequently used to supply power to the control circuit.

In one preferred embodiment, in the first sub-mode of the motor braking mode, a delay time is inserted between an end time of conduction of the plural low-side switches and a start time of conduction of the plural high-side switches, and/or between an end time of conduction of the plural high-side switches and a start time of conduction of the plural low-side switches, wherein during the delay time the plural high-side switches and the plural low-side switches are all non-conductive, wherein the delay time is determined based on at least one characteristic parameter of the multiphase motor and a preset braking time.

In one preferred embodiment, in the first sub-mode of the motor braking mode, when the plural high-side switches are conductive, or when the plural low-side switches are conductive, the multiphase motor forms a short-circuit loop, thereby consuming the back EMF of the multiphase motor, so as to reduce the rotation speed of the multiphase motor.

In one preferred embodiment, the control circuit generates a ramp signal, and a start time of conduction of the plural high-side switches and a start time of conduction of the plural low-side switches are determined based on crossover points of the ramp signal with a third voltage threshold and a fourth voltage threshold, respectively.

In one preferred embodiment, the first voltage threshold corresponds to a hysteresis voltage lower limit threshold, wherein the second voltage threshold corresponds to a hysteresis voltage upper limit threshold, wherein the hysteresis voltage lower limit threshold is less than the hysteresis voltage upper limit threshold, wherein the first sub-mode and the second sub-mode form hysteresis control, such that the holding voltage ramps up and down between the hysteresis voltage upper limit threshold and the hysteresis voltage lower limit threshold.

In one preferred embodiment, the multiphase motor driving circuit further includes a voltage regulator, configured to convert the holding voltage into a supply voltage to power the control circuit.

In one preferred embodiment, the first voltage threshold is greater than or equal to a minimum operating voltage of the control circuit.

In another aspect, the present invention provides a method for driving a multiphase motor, wherein the multiphase motor is coupled to a power stage circuit, the power stage circuit including plural switches. The method includes: cutting off a holding voltage from an input voltage to enter a shutdown procedure for the multiphase motor, wherein the holding voltage is configured to supply power for the multiphase motor in a motor operating mode; entering a motor braking mode when a holding voltage is less than a first voltage threshold; in the motor braking mode, entering a first sub-mode when the holding voltage is less than the first voltage threshold, wherein in the first sub-mode, at least a portion of the plural switches are controlled to switch periodically, thereby converting a back EMF of the multiphase motor into the holding voltage to supply power for controlling the power stage circuit; and in the motor braking mode, entering a second sub-mode when the holding voltage is greater than a second voltage threshold, wherein in the second sub-mode, at least a portion of the plural switches are controlled to remain continuously conductive, thereby consuming the back EMF of the multiphase motor, so as to reduce a rotation speed of the multiphase motor.

In one preferred embodiment, the motor braking mode is entered when the holding voltage is less than the first voltage threshold and the rotation speed of the multiphase motor is greater than a rotation speed threshold.

In one preferred embodiment, after the step of entering the motor braking mode when the holding voltage is less than the first voltage threshold, the method further includes waiting for a stabilization time.

In one preferred embodiment, the method further includes in the motor operating mode, controlling a path switch, which is coupled between the input voltage and the holding voltage, to be conductive to electrically connect the holding voltage to the input voltage, and controlling the plural switches in the power stage circuit to switch, thereby converting the holding voltage into a driving voltage to drive the multiphase motor to rotate, wherein the step of cutting off the holding voltage from the input voltage includes controlling the path switch non-conductive.

In one preferred embodiment, in the first sub-mode of the motor braking mode, the back EMF of the multiphase motor is converted into the holding voltage to charge a holding capacitor, wherein the holding capacitor is coupled to the holding voltage.

In one preferred embodiment, the power stage circuit includes plural high-side switches and plural low-side switches, wherein the plural low-side switches are coupled between plural switching nodes and a ground level, wherein the plural high-side switches are coupled between the holding voltage and the plural switching nodes, wherein the multiphase motor is coupled to the plural switching nodes, and wherein the step of reducing the rotation speed of the multiphase motor includes: in the second sub-mode, controlling the plural low-side switches in the power stage circuit to remain continuously conductive, thereby consuming the back EMF of the multiphase motor to reduce the rotation speed of the multiphase motor.

In one preferred embodiment, the step of converting the back EMF of the multiphase motor into the holding voltage to supply power for controlling the power stage circuit includes: in the first sub-mode, controlling the plural low-side switches in the power stage circuit to switch periodically, thereby converting the back EMF of the multiphase motor into the holding voltage through reverse boost conversion to supply power for controlling the power stage circuit.

In one preferred embodiment, the step of converting the back EMF of the multiphase motor into the holding voltage to supply power for controlling the power stage circuit includes: in the first sub-mode, controlling the plural high-side switches in the power stage circuit to remain non-conductive, thereby performing asynchronous reverse boost conversion through body diodes of the plural high-side switches.

In one preferred embodiment, the step of converting the back EMF of the multiphase motor into the holding voltage to supply power for controlling the power stage circuit further includes: in the first sub-mode, controlling the plural high-side switches in the power stage circuit to switch periodically, thereby converting the back EMF of the multiphase motor into the holding voltage through reverse boost conversion to supply power for controlling the power stage circuit.

In one preferred embodiment, in the first sub-mode of the motor braking mode, a delay time is inserted between an end time of conduction of the plural low-side switches and a start time of conduction of the plural high-side switches, and/or between an end time of conduction of the plural high-side switches and a start time of conduction of the plural low-side switches, wherein during the delay time the plural high-side switches and the plural low-side switches are all non-conductive, wherein the delay time is determined based on at least one characteristic parameter of the multiphase motor and a preset braking time.

In one preferred embodiment, the method further includes generating a ramp signal, wherein a start time of conduction of the plural high-side switches and a start time of conduction of the plural low-side switches are determined based on crossover points of the ramp signal with a third voltage threshold and a fourth voltage threshold.

In one preferred embodiment, the first voltage threshold corresponds to a hysteresis voltage lower limit threshold, wherein the second voltage threshold corresponds to a hysteresis voltage upper limit threshold, wherein the hysteresis voltage lower limit threshold is less than the hysteresis voltage upper limit threshold, wherein the first sub-mode and the second sub-mode form hysteresis control, such that the holding voltage ramps up and down between the hysteresis voltage upper limit threshold and the hysteresis voltage lower limit threshold.

In one preferred embodiment, the method further includes converting the holding voltage into a supply voltage to supply power for controlling the power stage circuit, wherein the supply voltage is lower than the holding voltage.

In one preferred embodiment, the method further includes completing the shutdown procedure for the multiphase motor when the holding voltage is less than a minimum voltage or the rotation speed of the multiphase motor is less than the rotation speed threshold.

The advantages of the present invention are that the present invention does not require additional circuits to achieve power-off braking, requires a smaller capacitor, and has a simpler circuit design.

This document has detailed the present invention through specific embodiments. However, these descriptions are intended to facilitate understanding of the present invention's objectives, technical contents, features, and achieved effects, rather than to limit the scope of the present invention. Various combinations and equivalent variations, under the spirit of the present invention, can be conceived by those skilled in the art without departing from the scope and spirit of the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
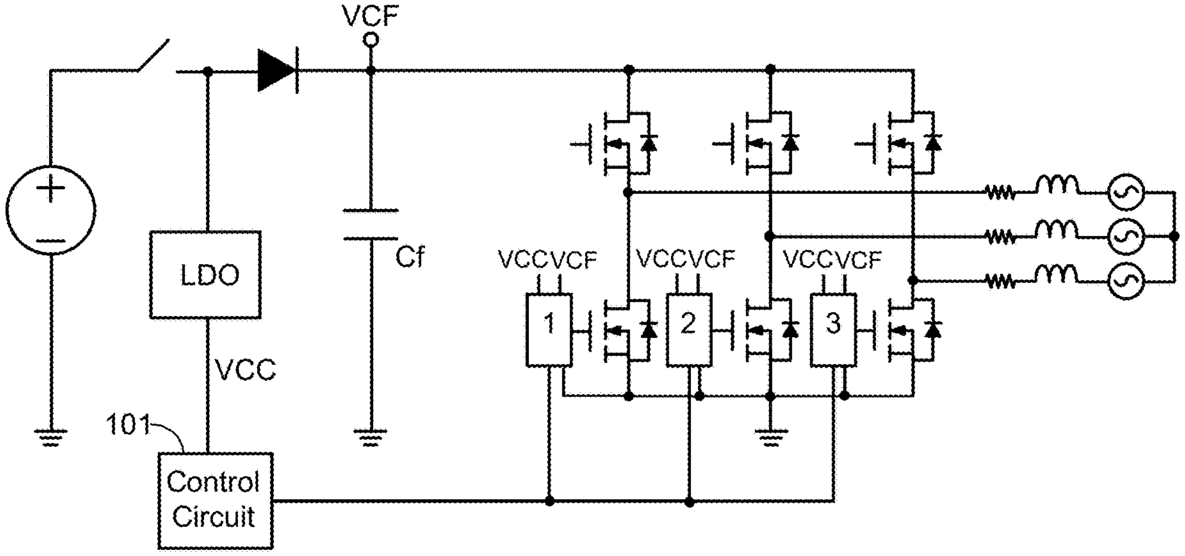
Fig. 1A (Prior Art)
FIG. 1A and FIG. 1B show prior art multiphase motor driving circuits.
Figure 1B:
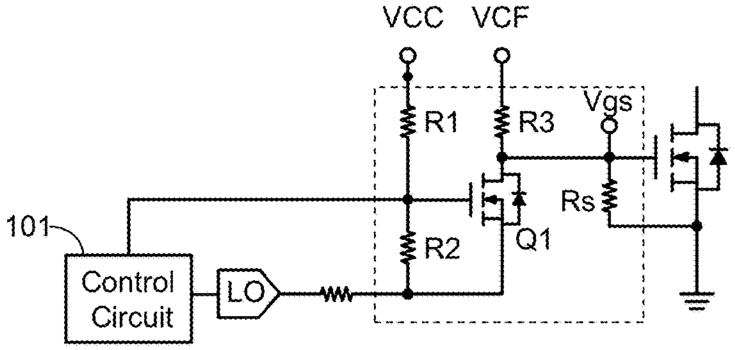
Fig. 1B (Prior Art)
Figure 2A:
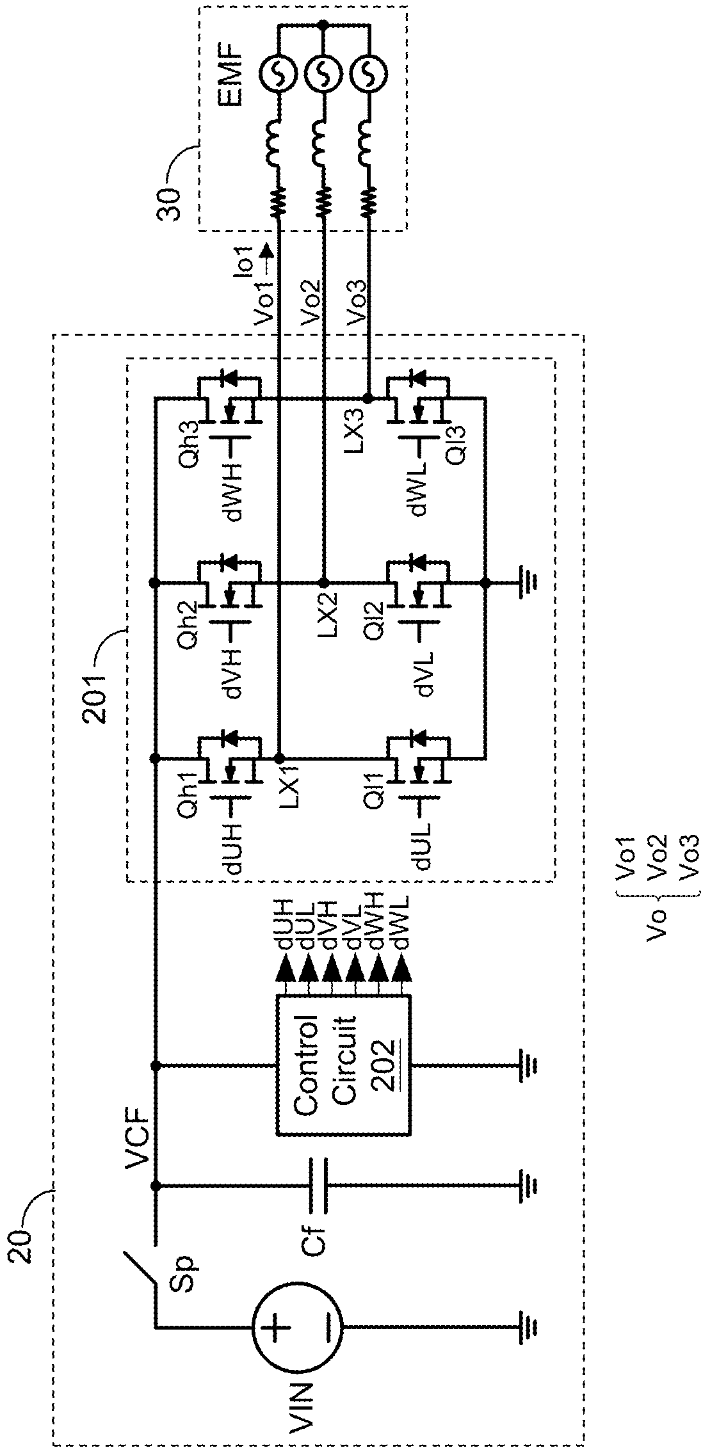
FIG. 2A illustrates a schematic circuit diagram of a multiphase motor driving circuit according to one embodiment of the present invention.

FIG. 2A illustrates a schematic circuit diagram of a multiphase motor driving circuit according to one embodiment of the present invention. As shown in FIG. 2A, the multiphase motor driving circuit 20 of the present invention includes a power stage circuit 201 and a control circuit 202. The power stage circuit 201 is coupled between a holding voltage VCF and a multiphase motor 30. The power stage circuit 201 is configured to operate the multiphase motor 30 according to pulse width modulation (PWM) signals dUH, dUL, dVH, dVL, dWH, dWL. In one embodiment, the power stage circuit 201 includes a multiphase inverter circuit. In one embodiment, the multiphase inverter circuit (201) includes a plurality of high-side switches Qh1, Qh2, Qh3, and a plurality of low-side switches Ql1, Ql2, Ql3. The plural high-side switches Qh1, Qh2, Qh3 are coupled between the holding voltage VCF and the corresponding plural switching nodes LX1, LX2, LX3, while the plural low-side switches Ql1, Ql2, Ql3 are coupled between the corresponding plural switching nodes LX1, LX2, LX3 and a ground level. The multiphase motor 30 is coupled to the plural switching nodes LX1, LX2, LX3. The control circuit 202 is configured to generate the pulse width modulation signals dUH, dUL, dVH, dVL, dWH, dWL based on the power provided by the holding voltage VCF. In a motor operating mode, the control circuit 202 generates the pulse width modulation signals dUH, dUL, dVH, dVL, dWH, dWL to control the switching of plural switches Qh1, Ql1, Qh2, Ql2, Qh3, Ql3 in the power stage circuit 201, thereby converting the holding voltage VCF to generate a driving voltage Vo to drive the multiphase motor 30 to rotate. In one embodiment, the multiphase motor 30 may be, for example, the multiphase motor of a fan. In one embodiment, the multiphase motor 30 may be, for example, a brushless DC motor.

As shown in FIG. 2A, the multiphase motor driving circuit 20 further includes a path switch Sp and a holding capacitor Cf. The path switch Sp is coupled between the input voltage VIN and the holding voltage VCF. In a motor operating mode, the path switch Sp is controlled to be turned on to electrically connect the holding voltage VCF to the input voltage VIN. The holding capacitor Cf is coupled to provide, maintain and filter the holding voltage VCF.

Figure 2B:
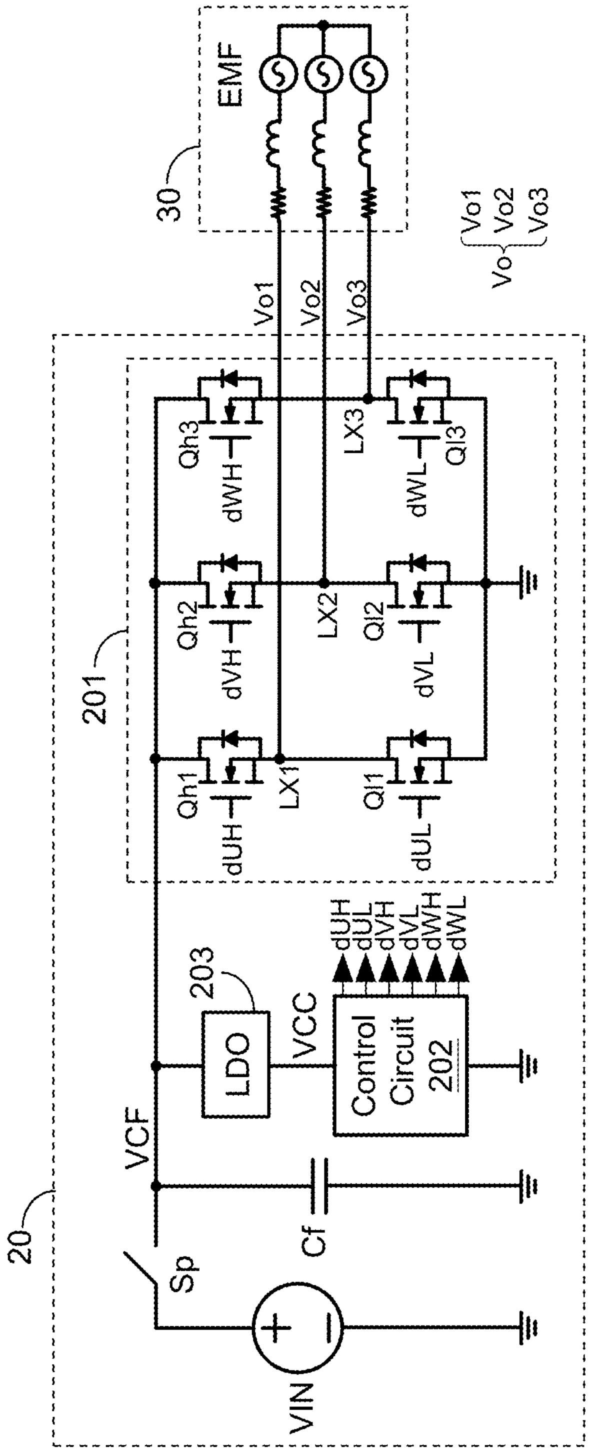
FIG. 2B illustrates a schematic circuit diagram of a multiphase motor driving circuit according to another embodiment of the present invention.

FIG. 2B illustrates a schematic circuit diagram of a multiphase motor driving circuit according to one embodiment of the present invention. This embodiment is similar to the embodiment of FIG. 2A, except that, as shown in FIG. 2B, the multiphase motor driving circuit 20 further includes a voltage regulator 203 (e.g., a low dropout linear regulator, symbolled as "LDO") configured to convert the holding voltage VCF into a supply voltage VCC to power the control circuit 202.

Figure 3A:
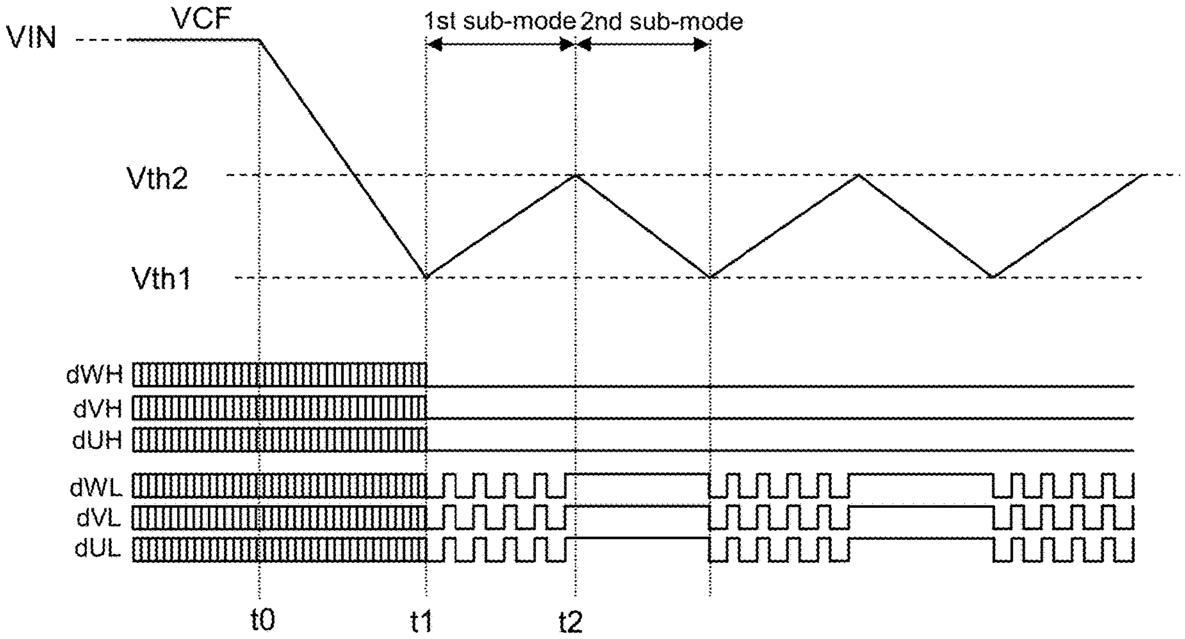
FIG. 3A illustrates a signal waveform diagram of related signals of a multiphase motor driving circuit according to one embodiment of the present invention.

FIG. 3A illustrates a signal waveform diagram of related signals of a multiphase motor driving circuit according to one embodiment of the present invention. The holding voltage VCF, pulse width modulation signals dUH, dUL, dVH, dVL, dWH, dWL are shown in FIG. 3A. Before time to, the multiphase motor driving circuit operates in a motor operating mode, with the holding voltage VCF equal to the input voltage VIN, and the pulse width modulation signals dUH, dUL, dVH, dVL, dWH, dWL switch to control the switching of plural switches Qh1, Ql1, Qh2, Ql2, Qh3, Ql3 in the power stage circuit 201, thereby converting the holding voltage VCF to generate a driving voltage Vo, so as to drive the multiphase motor 30. Subsequently, at time to, the path switch Sp is turned off, and the holding voltage VCF begins to decrease.

Continuing with FIG. 3A, in one embodiment, in a motor braking mode, when the holding voltage VCF falls below the voltage threshold Vth1 (time t1), the circuit enters a first sub-mode. In another embodiment, in the motor braking mode, the circuit enters the first sub-mode when the holding voltage VCF falls below the voltage threshold Vth1 and the speed of the multiphase motor 30 is greater than the speed threshold. Please refer to both FIG. 3A and FIG. 2A. In the first sub-mode, the control circuit 202 controls at least a portion of the switches in the power stage circuit 201, such as but not limited to the low-side switches Ql1, Ql2, Ql3, to switch periodically via the pulse width modulation signals dUL, dVL, dWL, thereby converting the back electromotive force (EMF) of the multiphase motor 30 into the holding voltage VCF through reverse boost conversion, so as to supply power to the control circuit 202 and charge the holding capacitor Cf. As shown in FIG. 3A and FIG. 2A, in one embodiment, in the first sub-mode of the motor braking mode, the control circuit 202 controls, for example the plural high-side switches Qh1, Qh2, Qh3, in the power stage circuit 201 via the pulse width modulation signals dUH, dVH, dWH, such that the plural high-side switches Qh1, Qh2, Qh3 are kept non-conductive, thereby performing asynchronous reverse boost conversion through the body diodes of the plural high-side switches Qh1, Qh2, Qh3. As shown in FIG. 3A, the holding voltage VCF starts to rise from time t1 due to the reverse boost conversion. In one embodiment, the voltage threshold Vth1 is greater than or equal to the minimum operating voltage of the control circuit 202, thereby allowing the control circuit 202 to continue operating in the motor braking mode to control the power stage circuit 201.

As shown in FIG. 3A, in the motor braking mode, when the holding voltage VCF rises above the voltage threshold Vth2 (time t2), the circuit enters the second sub-mode. Please refer to both FIG. 3A and FIG. 2A. In the second sub-mode, the control circuit 202 controls at least a portion of the switches in the power stage circuit 201 via the pulse width modulation signals dUL, dVL, dWL, such as but not limited to the low-side switches Ql1, Ql2, Ql3, to remain conductive, thereby consuming the back EMF of the multiphase motor 30 to reduce the rotation speed of the multiphase motor 30. As shown in FIG. 3A and FIG. 2A, in this embodiment, in the second sub-mode of the motor braking mode, the plural high-side switches Qh1, Qh2, Qh3 are still controlled to remain non-conductive.

In one embodiment, the voltage threshold Vth1 corresponds to a hysteresis voltage lower limit threshold Vhys_L, and the voltage threshold Vth2 corresponds to a hysteresis voltage upper limit threshold Vhys_H, where the hysteresis voltage lower limit threshold Vhys_L is less than the hysteresis voltage upper limit threshold Vhys_H, and the first sub-mode and the second sub-mode form hysteresis control, such that the holding voltage VCF ramps up and down between the hysteresis voltage upper limit threshold Vhys_H and the hysteresis voltage lower limit threshold Vhys_L.

Figure 3B:
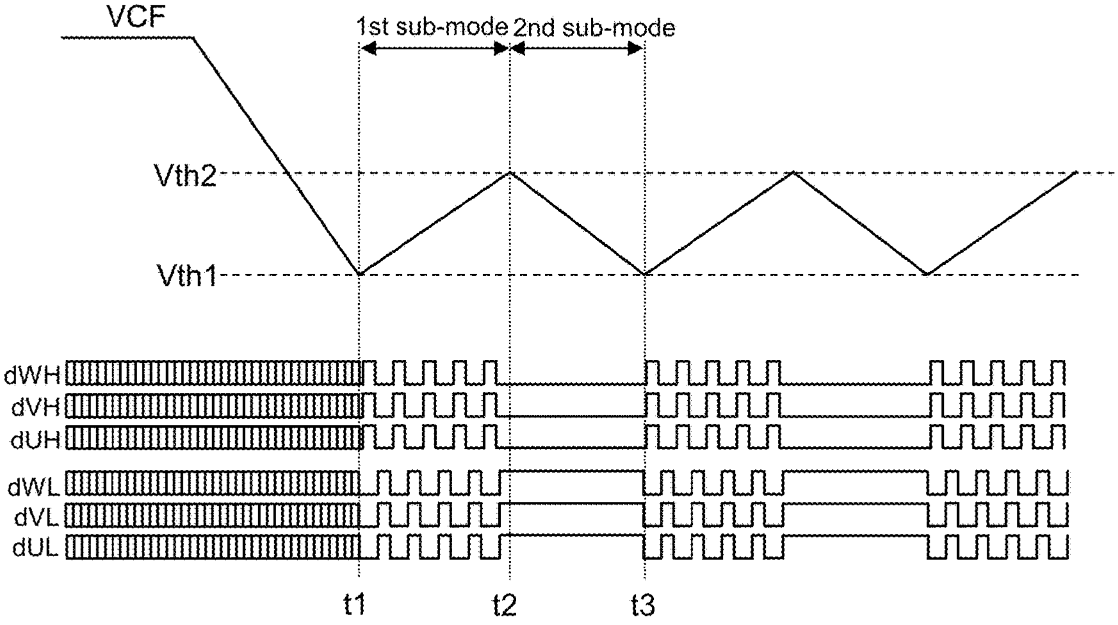
FIG. 3B illustrates a signal waveform diagram of related signals of a multiphase motor driving circuit according to another embodiment of the present invention.

FIG. 3B illustrates a signal waveform diagram of related signals of a multiphase motor driving circuit according to another embodiment of the present invention. The holding voltage VCF, the pulse width modulation signals dUH, dUL, dVH, dVL, dWH, dWL are shown in FIG. 3B. This embodiment is similar to the embodiment of FIG. 3A, with the difference that, referring to both FIG. 3B and FIG. 2A, during the period from time t1 to time t2, in the first sub-mode of the motor braking mode, the control circuit 202 also controls, for example the plural high-side switches Qh1, Qh2, Qh3, in the power stage circuit 201 via the modulation signals dUH, dVH, dWH to switch pulse width periodically, thereby converting the back EMF of the multiphase motor 30 into the holding voltage VCF through reverse boost conversion, so as to supply power to the control circuit 202. In this embodiment, in the first sub-mode of the motor braking mode, since both the high-side switches Qh1, Qh2, Qh3 and the low-side switches Ql1, Ql2, Ql3 are switched periodically in an interleaved manner, the conduction and non-conduction times of the high-side switches Qh1, Qh2, Qh3 and the low-side switches Ql1, Ql2, Ql3 are relatively balanced, which also helps balance and extend the life of the high-side and low-side switches.

Figure 3C:
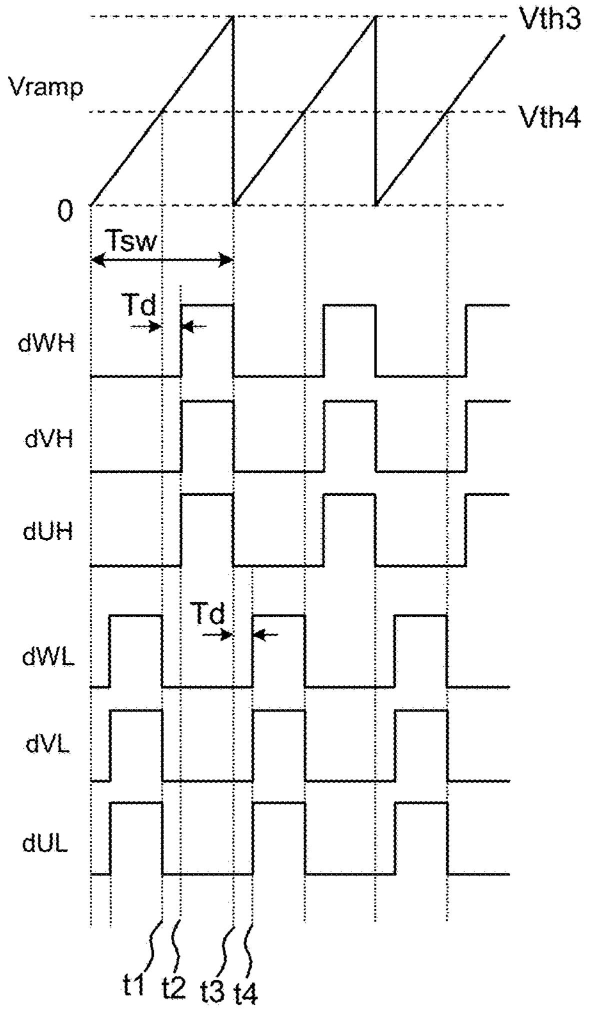
FIG. 3C illustrates a signal waveform diagram of related signals of a multiphase motor driving circuit according to one embodiment of the present invention.

FIG. 3C illustrates a signal waveform diagram of related signals of a multiphase motor driving circuit according to one embodiment of the present invention. The ramp signal Vramp, the pulse width modulation signals dUH, dUL, dVH, dVL, dWH, dWL are shown in FIG. 3C. As shown in FIG. 3C, in the first sub-mode of the motor braking mode, a delay time Td is inserted between the end of the conduction of the plural low-side switches Ql1, Ql2, Ql3 (e.g., time t1) and the start of the conduction of the plural high-side switches Qh1, Qh2, Qh3 (e.g., time t2), and/or between the end of the conduction of the plural high-side switches Qh1, Qh2, Qh3 (e.g., time t3) and the start of the conduction of the plural low-side switches Ql1, Ql2, Ql3 (e.g., time t4). In one embodiment, the delay time Td can be obtained from the following equations (1) and (2):

$$Td = \frac{T_{SW}}{2} \times (1 - Sb) \quad (1)$$

$$\text{Ton\_hs} = \text{Ton\_ls} = \frac{T_{SW}}{2} - Td \quad (2)$$

where Tsw is the switching period, Sb is a braking intensity (%), Ton_hs is the conduction time of the high-side switch, and Ton_ls is the conduction time of the low-side switch. In one embodiment, the longer the delay time Td, the smaller the braking intensity Sb. During the delay time Td, both the plural high-side switches Qh1, Qh2, Qh3 and the plural low-side switches Ql1, Ql2, Ql3 are non-conductive. In one embodiment, the delay time Td is adjustable.

In one embodiment, the delay time Td is determined based on at least one characteristic parameter of the multiphase motor 30 and a preset braking time. Please refer to both FIG. 2A and FIG. 3C, the control circuit 202 generates a ramp signal Vramp, and the start time of the conduction of the plural high-side switches Qh1, Qh2, Qh3 and the start time of the conduction of the plural low-side switches Ql1, Ql2, Ql3 are respectively determined according to the cross-over points of the ramp signal Vramp with the voltage threshold Vth3 and the voltage threshold Vth4. In one embodiment, the delay time Td also affects the duty ratio and conversion ratio of the reverse boost conversion, in other words, the delay time Td affects the slope of the rise in the holding voltage VCF during for example the first sub-mode in FIG. 3A or FIG. 3B, thereby affecting the overall braking time. In one embodiment, in the first sub-mode, the duty ratio of the high-side switches Qh1, Qh2, Qh3 is the same as the duty ratio of the low-side switches Ql1, Ql2, Ql3.

Figure 3D:
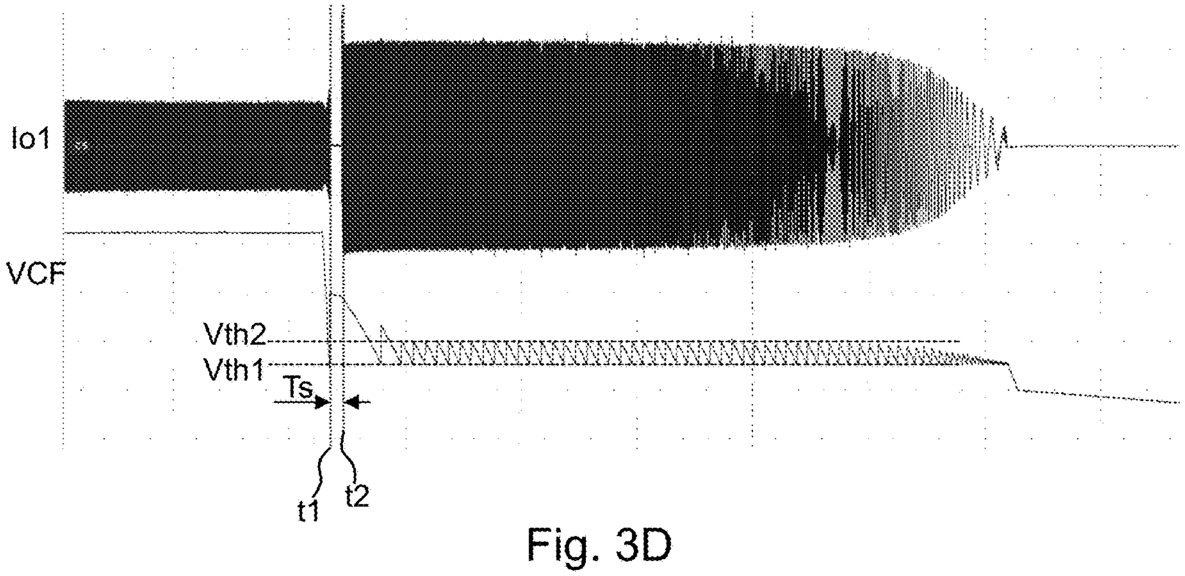
FIG. 3D illustrates a signal waveform diagram of related signals of a multiphase motor driving circuit according to one embodiment of the present invention.

FIG. 3D illustrates a signal waveform diagram of related signals of a multiphase motor driving circuit according to one embodiment of the present invention. The holding voltage VCF and the output current Io1 are shown in FIG. 3D. Please refer to both FIG. 2A and FIG. 3D, at time t1, when the path switch Sp is non-conductive and after a stabilization time Ts, the circuit enters the motor braking mode at time t2.

Figure 4A:
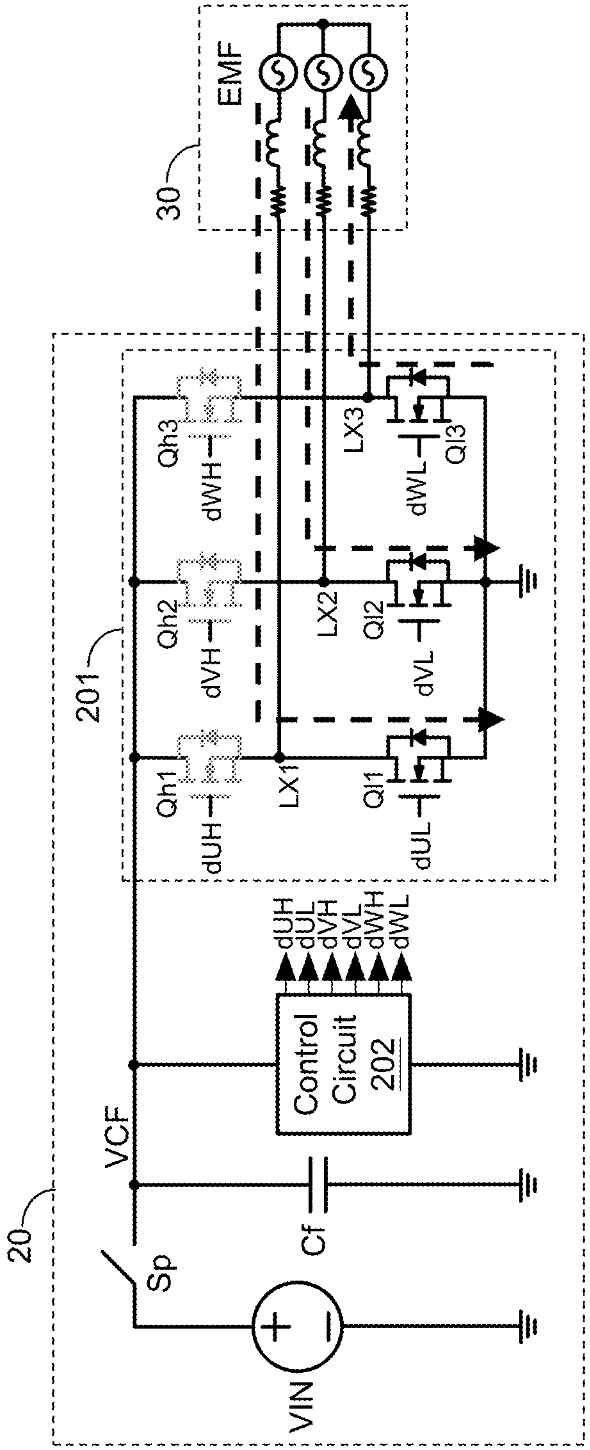
FIGS. 4A-4C illustrate schematic circuit and operation diagrams of a multiphase motor driving circuit according to embodiments of the present invention.
Figure 4B:
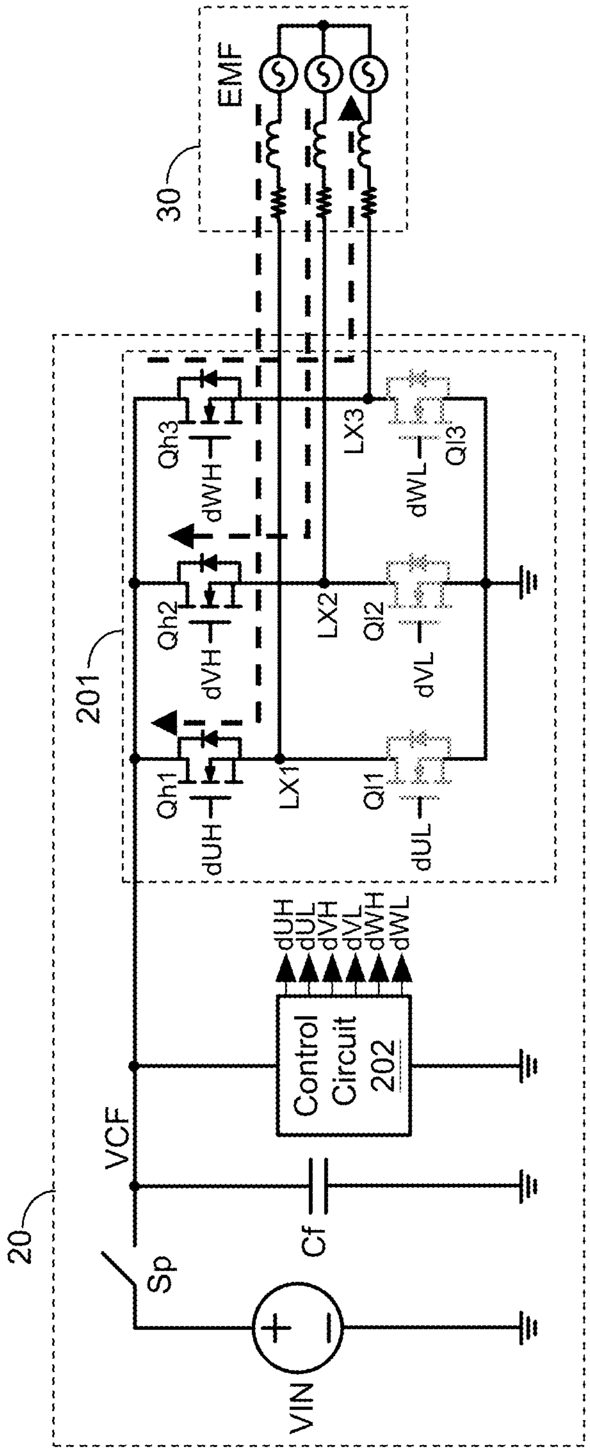
Figure 4C:
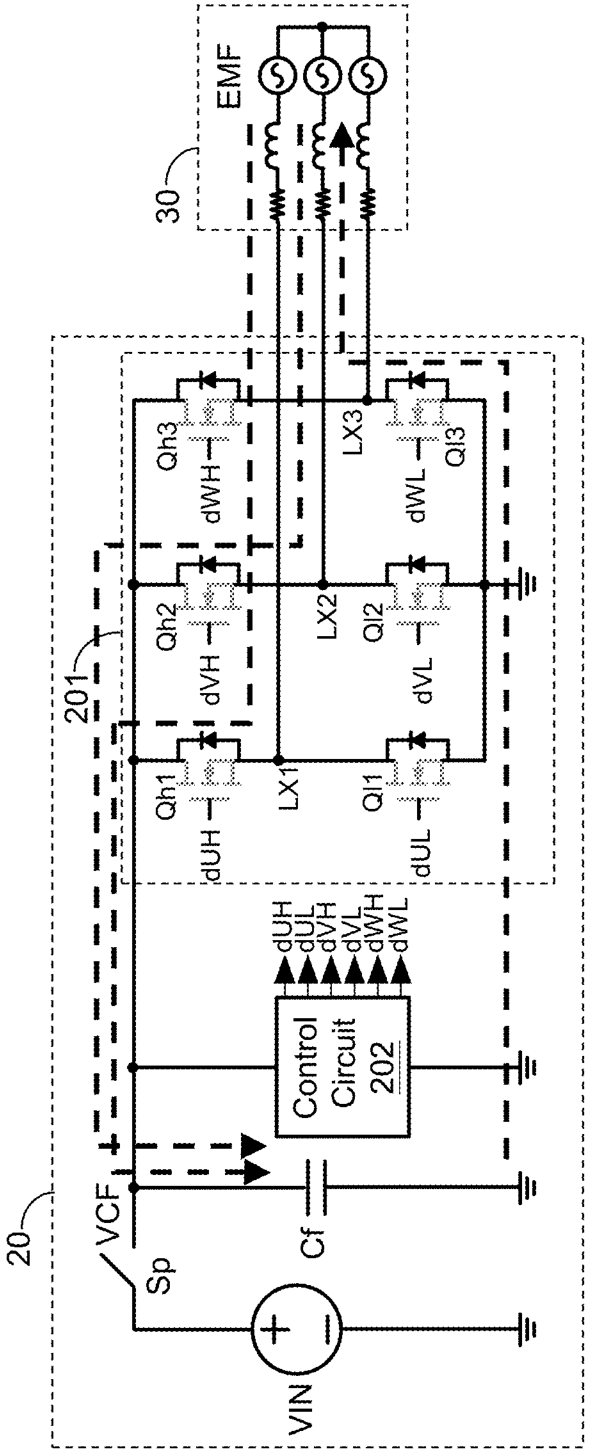

FIGS. 4A-4B illustrate schematic circuit and operation diagrams of a multiphase motor driving circuit according to embodiments of the present invention. As shown in FIG. 4A, in the first sub-mode of the motor braking mode, when the plural low-side switches Ql1, Ql2, Ql3 are conductive, the multiphase motor 30 forms a short-circuit loop, thereby consuming the back EMF of the multiphase motor 30 to reduce the rotation speed of the multiphase motor 30. As shown in FIG. 4B, in the first sub-mode of the motor braking mode, when the plural high-side switches Qh1, Qh2, Qh3 are conductive, the multiphase motor 30 forms a short-circuit loop, thereby consuming the back EMF of the multiphase motor 30 through the resistance in the short-circuit loop, so as to reduce the rotation speed of the multiphase motor 30. FIG. 4C illustrates a schematic circuit and operation diagram of a multiphase motor driving circuit according to one embodiment of the present invention. This embodiment shows that during the delay time Td, when both the plural high-side switches Qh1, Qh2, Qh3 and the low-side switches Ql1, Ql2, Ql3 are non-conductive, the multiphase motor 30 forms a short-circuit loop through the body diodes of the high-side switches Qh1, Qh2 and the low-side switch Ql3, thereby charging the holding capacitor Cf to provide the holding voltage VCF to power the control circuit 202, while also consuming the back EMF of the multiphase motor 30 to reduce the rotation speed of the multiphase motor 30.

Figure 4D:
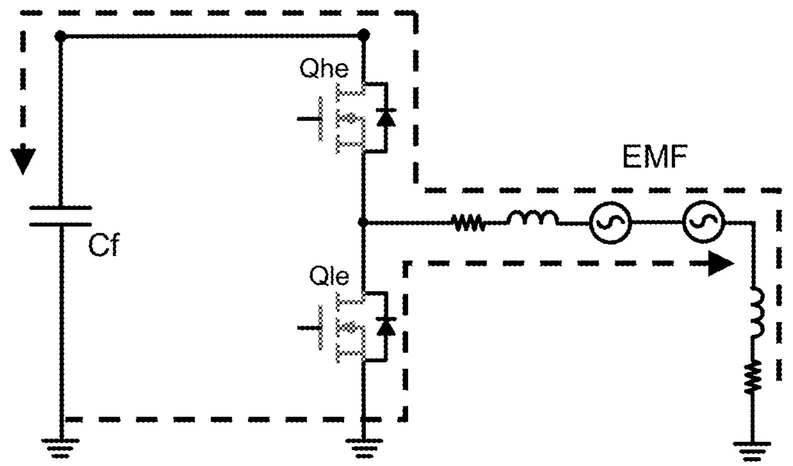
FIG. 4D illustrates a simplified schematic circuit diagram of a multiphase motor driving circuit according to one embodiment of the present invention.

FIG. 4D illustrates a simplified schematic circuit diagram of a multiphase motor driving circuit according to one embodiment of the present invention. This embodiment is a simplified circuit diagram of the embodiment shown in FIG. 4C. The high-side switch Qhe is equivalent to the high-side switches Qh1 and Qh2 shown in FIG. 4C, while the low-side switch Qle is equivalent to the low-side switch Ql3 shown in FIG. 4C.

Figure 5A:
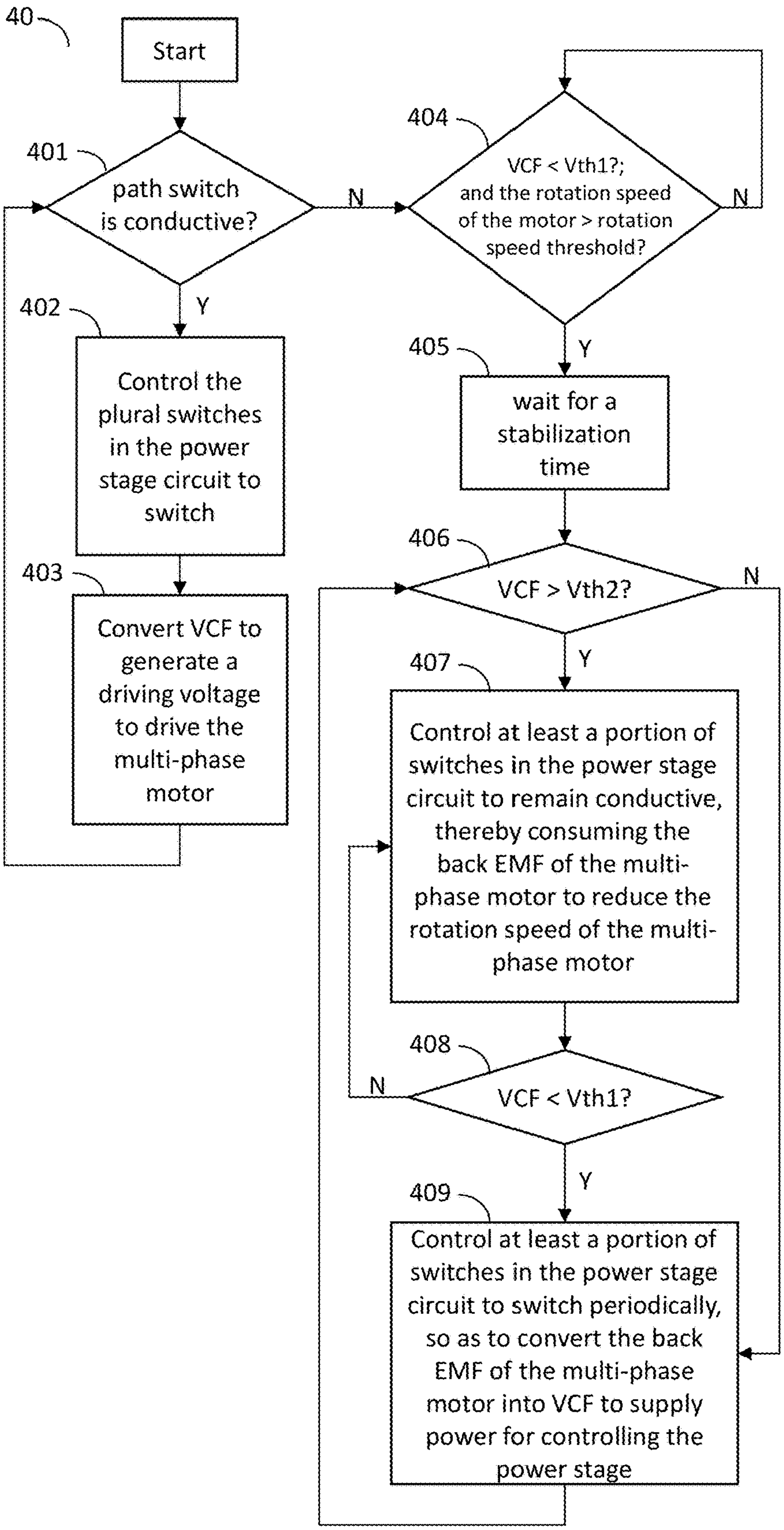
FIG. 5A illustrates a flowchart showing steps of a multiphase motor driving method according to one embodiment of the present invention.

FIG. 5A illustrates a flowchart showing steps of multiphase motor driving method according to one embodiment of the present invention. As shown in FIG. 5A, the multiphase motor driving method 40 of the present invention includes step 401, in which whether the path switch Sp is conductive is checked. If not, indicating that the power source (i.e., input voltage VIN) for the multiphase motor 30 is cut off (i.e., a shutdown procedure for shutting down the multiphase motor is started), the process proceeds to step 404. In step 404, whether the holding voltage VCF is less than the voltage threshold Vth1 and whether the rotation speed of the multiphase motor 30 is greater than the rotation speed threshold are checked. If yes, the process proceeds to step 405. If not, the process returns to step 404. In step 405, waiting for a stabilization time is implemented. Subsequently, in step 406, whether the holding voltage VCF is greater than the voltage threshold Vth2 is checked. If yes, the process proceeds to step 407. If not, the process proceeds to step 409. In step 407, at least a portion of the plural switches (Qh1, Ql1, Qh2, Ql2, Qh3, Ql3) are controlled to remain conductive, thereby consuming the back EMF of the multiphase motor 30, so as to reduce the rotation speed of the multiphase motor 30. Subsequently, in step 408, whether the holding voltage VCF is less than the voltage threshold Vth1 is checked. If yes, the process proceeds to step 409. If not, the process returns to step 407. In step 409, at least a portion of the plural switches are controlled to switch periodically, so as to convert the back EMF of the multiphase motor 30 into the holding voltage VCF to supply power. After step 409 is completed, the process returns to step 406.

On the other hand, in step 401, if the path switch Sp is conductive, indicating that the input voltage VIN to the multiphase motor 30 is normally turned on, the process proceeds to steps 402 and 403: the plural switches Qh1, Ql1, Qh2, Ql2, Qh3, Ql3 in the power stage circuit 201 are controlled to switch, thereby converting the holding voltage VCF, so as to generate a driving voltage Vo to drive the multiphase motor 30.

Figure 5B:
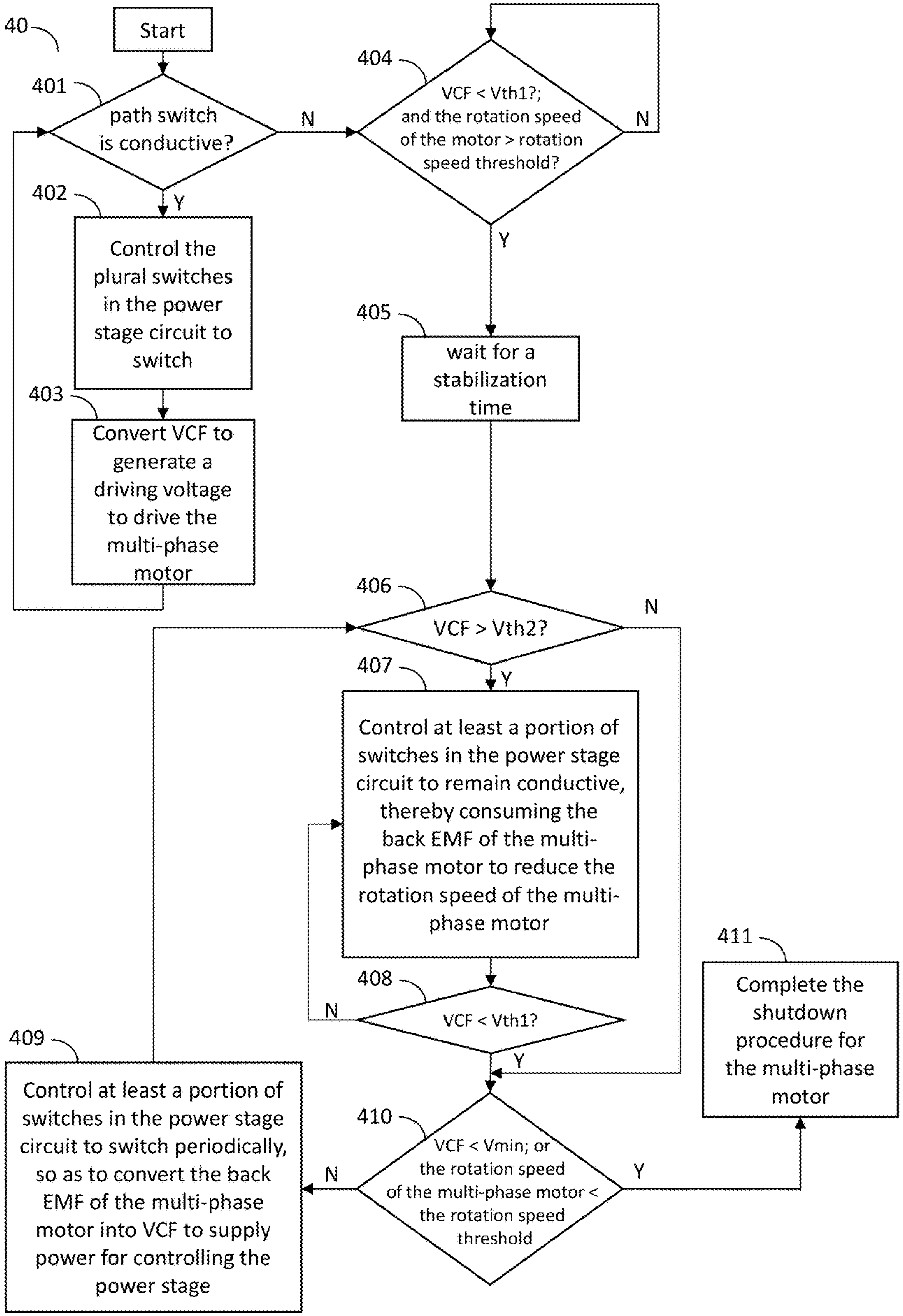
FIG. 5B illustrates a flowchart showing steps of a multiphase motor driving method according to another embodiment of the present invention.

FIG. 5B: illustrates a flowchart showing steps of a multiphase motor driving method according to another embodiment of the present invention. This embodiment is similar to the embodiment of FIG. 5A, with the difference that when the result of step 408 is yes, the process proceeds to step 410. In step 410, whether the holding voltage VCF is less than a minimum voltage Vmin or whether the rotation speed of the multiphase motor 30 is less than the rotation speed threshold is checked. If yes, the process proceeds to step 411. If not, the process proceeds to step 409. In step 411, the shutdown procedure for the multiphase motor 30 is completed.

Figure 5C:
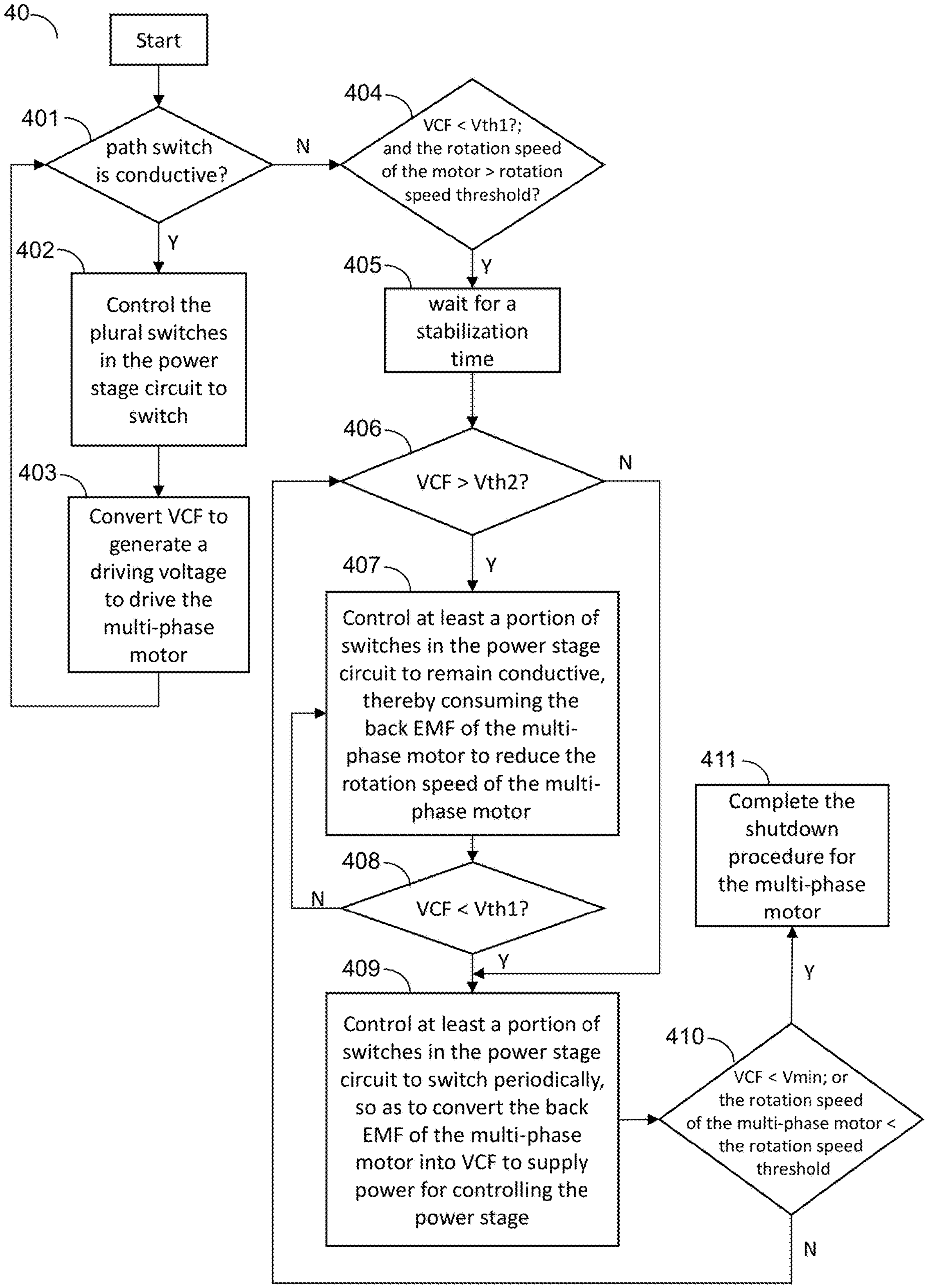
FIG. 5C illustrates a flowchart showing steps of a multiphase motor driving method according to yet another embodiment of the present invention.

FIG. 5C illustrates a flowchart showing steps of a multiphase motor driving method according to yet another embodiment of the present invention. This embodiment is similar to the embodiment of FIG. 5B, with the difference that in this embodiment, step 410 follows step 409 and step 409 follows step 408.

In summary, the present invention does not require additional external circuits to achieve power-off braking, requires a smaller capacitor, and has a simpler circuit design, thereby saving costs.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A multiphase motor driving circuit, comprising:

a power stage circuit, coupled between a holding voltage and a multiphase motor, wherein the power stage circuit is configured to operate the multiphase motor according to a pulse width modulation (PWM) signal; and a control circuit, configured to generate the PWM signal based on power supplied by the holding voltage;

wherein, in a motor braking mode, when the holding voltage is less than a first voltage threshold, a first sub-mode is entered, wherein in the first sub-mode, the control circuit controls at least a portion of plural switches in the power stage circuit to switch periodically utilizing the PWM signal, thereby converting a back electromotive force (EMF) of the multiphase motor into the holding voltage, which is subsequently used to supply power to the control circuit;

wherein, in the motor braking mode, when the holding voltage is greater than a second voltage threshold, a second sub-mode is entered, wherein in the second sub-mode, the control circuit controls at least a portion of the plural switches in the power stage circuit to remain continuously conductive utilizing the PWM signal, thereby consuming the back EMF of the multiphase motor, so as to reduce a rotation speed of the multiphase motor;

wherein a voltage regulator is configured to convert the holding voltage into a supply voltage to power the control circuit;

wherein the first voltage threshold is greater than or equal to a minimum operating voltage of the control circuit.

2. The multiphase motor driving circuit of claim 1, wherein in the motor braking mode, the first sub-mode is entered when the holding voltage is less than the first voltage threshold and the rotation speed of the multiphase motor is greater than a rotation speed threshold.

3. The multiphase driving circuit of claim 1, further comprising a path switch, coupled between an input voltage and the holding voltage;

wherein, in a motor operating mode, the path switch is controlled to be conductive to electrically connect the holding voltage to the input voltage, wherein the control circuit controls a plurality of switches in the power stage circuit to switch utilizing the PWM signal, thereby converting the holding voltage into a driving voltage to drive the multiphase motor to rotate;

wherein, when the path switch is non-conductive and after waiting for a stabilization time, the motor braking mode is entered.

4. The multiphase motor driving circuit of claim 1, further comprising a holding capacitor, coupled to the holding voltage, wherein in the first sub-mode of the motor braking mode, the back EMF of the multiphase motor is converted into the holding voltage to charge the holding capacitor.

5. The multiphase motor driving circuit of claim 1, wherein the power stage circuit includes a multiphase inverter circuit, wherein the multiphase inverter circuit includes plural high-side switches and plural low-side switches, wherein the plural high-side switches are coupled between the holding voltage and corresponding plural switching nodes, wherein the plural low-side switches are coupled between the corresponding plural switching nodes and a ground level, the multiphase motor being coupled to the plural switching nodes.

6. The multiphase motor driving circuit of claim 5, wherein in the second sub-mode of the motor braking mode, the control circuit controls the plural low-side switches in the power stage circuit to remain continuously conductive utilizing the PWM signal, thereby consuming the back EMF of the multiphase motor, so as to reduce the rotation speed of the multiphase motor.

7. The multiphase motor driving circuit of claim 5, wherein in the first sub-mode of the motor braking mode, the control circuit controls the plural low-side switches in the power stage circuit to switch periodically utilizing the PWM signal, thereby converting the back EMF of the multiphase motor into the holding voltage through reverse boost conversion, which is subsequently used to supply power to the control circuit.

8. The multiphase motor driving circuit of claim 7, wherein in the first sub-mode of the motor braking mode, the control circuit controls the plural high-side switches in the power stage circuit to remain non-conductive utilizing the PWM signal, thereby performing asynchronous reverse boost conversion through body diodes of the plural high-side switches.

9. Of The multiphase motor driving circuit claim 7, wherein in the first sub-mode of the motor braking mode, the control circuit further controls the plural high-side switches in the power stage circuit to switch periodically utilizing the PWM signal, thereby converting the back EMF of the multiphase motor into the holding voltage through reverse boost conversion, which is subsequently used to supply power to the control circuit.

10. The multiphase motor driving circuit of claim 9, wherein in the first sub-mode of the motor braking mode, a delay time is inserted between an end time of conduction of the plural low-side switches and a start time of conduction of the plural high-side switches, and/or between an end time of conduction of the plural high-side switches and a start time of conduction of the plural low-side switches, wherein during the delay time the plural high-side switches and the plural low-side switches are all non-conductive, wherein the delay time is determined based on at least one characteristic parameter of the multiphase motor and a preset braking time.

11. The multiphase motor driving circuit of claim 9, wherein in the first sub-mode of the motor braking mode, when the plural high-side switches are conductive, or when the plural low-side switches are conductive, the multiphase motor forms a short-circuit loop, thereby consuming the back EMF of the multiphase motor, so as to reduce the rotation speed of the multiphase motor.

12. The multiphase motor driving circuit of claim 9, wherein the control circuit generates a ramp signal, and a start time of conduction of the plural high-side switches and a start time of conduction of the plural low-side switches are determined based on crossover points of the ramp signal with a third voltage threshold and a fourth voltage threshold, respectively.

13. The multiphase motor driving circuit of claim 1, wherein the first voltage threshold corresponds to a hysteresis voltage lower limit threshold, wherein the second voltage threshold corresponds to a hysteresis voltage upper limit threshold, wherein the hysteresis voltage lower limit threshold is less than the hysteresis voltage upper limit threshold, wherein the first sub-mode and the second sub-mode form hysteresis control, such that the holding voltage ramps up and down between the hysteresis voltage upper limit threshold and the hysteresis voltage lower limit threshold.

* * * * *